US006965104B2

(12) United States Patent
Yamaguchi

(10) Patent No.: US 6,965,104 B2
(45) Date of Patent: Nov. 15, 2005

(54) LASER OPTICAL APPARATUS

(75) Inventor: Yoshimasu Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 10/631,729

(22) Filed: Aug. 1, 2003

(65) Prior Publication Data

US 2004/0065820 A1 Apr. 8, 2004

(30) Foreign Application Priority Data

Aug. 2, 2002 (JP) ....................................... 2002-225961

(51) Int. Cl.[7] ................................................ G02B 26/08
(52) U.S. Cl. ........................ 250/234; 359/198; 359/212; 347/256
(58) Field of Search ................................. 250/234–236, 250/239; 347/225, 241–243, 256–261; 359/196, 198, 204, 206, 212, 214, 223

(56) References Cited

U.S. PATENT DOCUMENTS 5,001,499 A 3/1991 Waragai et al. ............. 346/160
5,844,707 A * 12/1998 Minakuchi et al. ......... 359/204
6,194,713 B1 2/2001 Kanazawa .................. 250/234

FOREIGN PATENT DOCUMENTS

DE 197 03 691 A1 10/1997

* cited by examiner

*Primary Examiner*—Kevin Pyo
(74) *Attorney, Agent, or Firm*—Fitzpatrick, Cella, Harper & Scinto

(57) ABSTRACT

A laser scanner with excellent productivity is provided in which most parts can be commonly used so as to recycle individually costly and expensive components once used in one product from the points of view of ecology, resource savings and recycling. The laser scanner includes a light source with a laser diode, a polygon motor with a polygon mirror mounted on a rotating shaft thereof, scanning lenses, a BD detection device, and a scanner casing with the BD detection device being held thereby and received therein. The single scanner casing is provided therein with a mounting bearing surface, which serves to permit a plurality of mirror configurations to be housed and arranged therein in accordance with the presence or absence of a reflection mirror, whereby it is possible to selectively form optical paths for irradiating a plurality of laser beams onto a photosensitive drum.

9 Claims, 6 Drawing Sheets

LASER OPTICAL APPARATUS

This application claims the right of priority under 35 U.S.C. § 119 based on Japanese Patent Application No. JP 2002-225961 which is hereby incorporated by reference herein in their entirety as if fully set forth herein.

BACKGROUND OF THE INVENTION (i) Field of the Invention

The present invention relates to a laser optical apparatus suitably used as an exposure device for exposing a photosensitive member in an electrophotographic system image forming apparatus.

(ii) Description of the Related Art

In the past, there have been a lot of image forming apparatuses such as laser beam printers, copying machines using laser beams, etc., which adopt an image forming process of a horizontal sheet feed type.

In recent years, however, there have come to be manufactured an increasing number fo image forming apparatuses of the type called a "vertical sheet feed type" in which a paper feed device is arranged at a lower portion of the apparatus, with sheets of paper fed by the paper feed device being conveyed in an upward direction from below to above so as to be discharged from an upper location.

This is due to the fact that in accordance with the progress of digitalization, it becomes possible to optically separate a document image reading device, which is in the form of a so-called image scanner for reading an original document, and an image forming part, which is in the form of an image forming process, from each other. Therefore, optical information read in by an image reading means can be replaced with an electric signal or an image signal by the use of a photoelectric conversion means such as a CCD or the like, and then the image signal thus produced can be sent through an electric line to an image forming part in the form of a printing part where it can be converted into an optical signal at an arbitrary location, which is in turn irradiated onto a photosensitive drum to form a latent image.

Thus, by using a laser beam as a writing means in accordance with an increased number of degrees of freedom of the writing position with respect to the photosensitive drum on which it becomes possible to set the position of irradiation of a laser beam at an appropriate location, an image forming process, which has been performed by using a horizontal sheet feed method in the past, can be carried out even by an image forming process using a vertical sheet feed method.

In addition, in an image forming means such as a developing device, a toner replenishment device, etc., in which toner is replenished from below to a photosensitive drum which is arranged at an upper location, technical advancements have been made in a drawn-up developing method of supplying toner to a developing sleeve disposed at a position higher than storage parts that store a developing material, toner and the like. Also, in connection with cleaning means, a lot of technical advancements have been made in downwardly directed cleaning means for performing cleaning in a reliable manner with an opening being directed downwardly in alignment and abutment with a photosensitive drum. As a result of such technical advancements, the image forming process according to the vertical sheet feed method has been made feasible.

Owing to the achievement of such an image forming process according to the vertical sheet feed method, it becomes possible for the layout of the image forming apparatus to take a short path configuration, as described below in detail. That is, a paper feed device including paper cassettes, a registration means, a photosensitive drum, a developing device and an image forming means including a cleaning means are sequentially arranged in a vertical direction from below to above, and at locations above these components, there can be arranged a paper conveying part and a fixing device, in the upper neighborhood of which there are also arranged a paper discharge means and a paper discharge opening. With such an arrangement, a short path configuration can be achieved without formation of any extreme bend of the conveying path extending from the paper feed means to the paper discharge means, thereby making it possible to shorten the travel or conveying distance of the paper and reduce the number of component parts required as well.

Moreover, the sheet conveying path can be vertically arranged in a relatively straight line, so that the space occupied by the sheet conveying path with respect to that of the entire apparatus can be reduced, thus making it possible to achieve reduction in size and cost as well as to shorten the time required for the paper to pass through the sheet conveying path. Furthermore, the increased number fo degrees of freedom of the layout serves to increase the density in arrangement of the component parts and save space as required, as a consequence of which the size of the entire apparatus such as an image forming apparatus can be decreased.

In addition, a lot of the following laser optical apparatuses have been used as a writing device for image exposure. That is, image information is emitted as a laser beam from a source of light using a laser diode, so that the laser beam thus emitted is irradiated onto a photosensitive drum while being scanned by means of a motor having a polygon mirror mounted thereon.

In such a laser optical apparatus, in order to ensure a specified degree of image quality by pinpointing a laser beam and providing a clear image, lenses are arranged such that the laser beam can be focused on the photosensitive drum.

Also, such a laser optical apparatus often uses about one to three reflection mirrors so as to provide freedom in the layout of the photosensitive drum and the laser light source thereby to change the direction of the optical path.

In order to satisfy demands or requirements such as the size, arrangement, etc., of a laser optical apparatus used in each product, it is necessary to individually design and fabricate such a laser optical apparatus for each image forming apparatus being used.

SUMMARY OF THE INVENTION

An object of the present invention is to provide a laser optical apparatus which can be commonly used in mutually different image forming apparatuses.

An object of the present invention is to provide a laser optical apparatus which can emit a laser beam in two different directions.

A specific object of the present invention is to provide a laser optical apparatus comprising:

a laser source for emitting a laser beam;

scanning means for changing and scanning the laser beam emitted from the laser source; and an optical casing with the laser source and the scanning means accommodated therein, the optical casing having a first opening and a second opening formed for selectively permitting the laser beam scanned by the scanning means to pass therethrough.

The above and other objects, features and advantages of the present invention will become apparent from the following description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings. However, it is to be understood that the measurements, materials, configurations, relative arrangements and the like of component parts described in the following embodiments are only illustrative but should not be construed as limiting the range of legal protection for the present invention in any manner, in particular unless specified otherwise.

Figure 1:
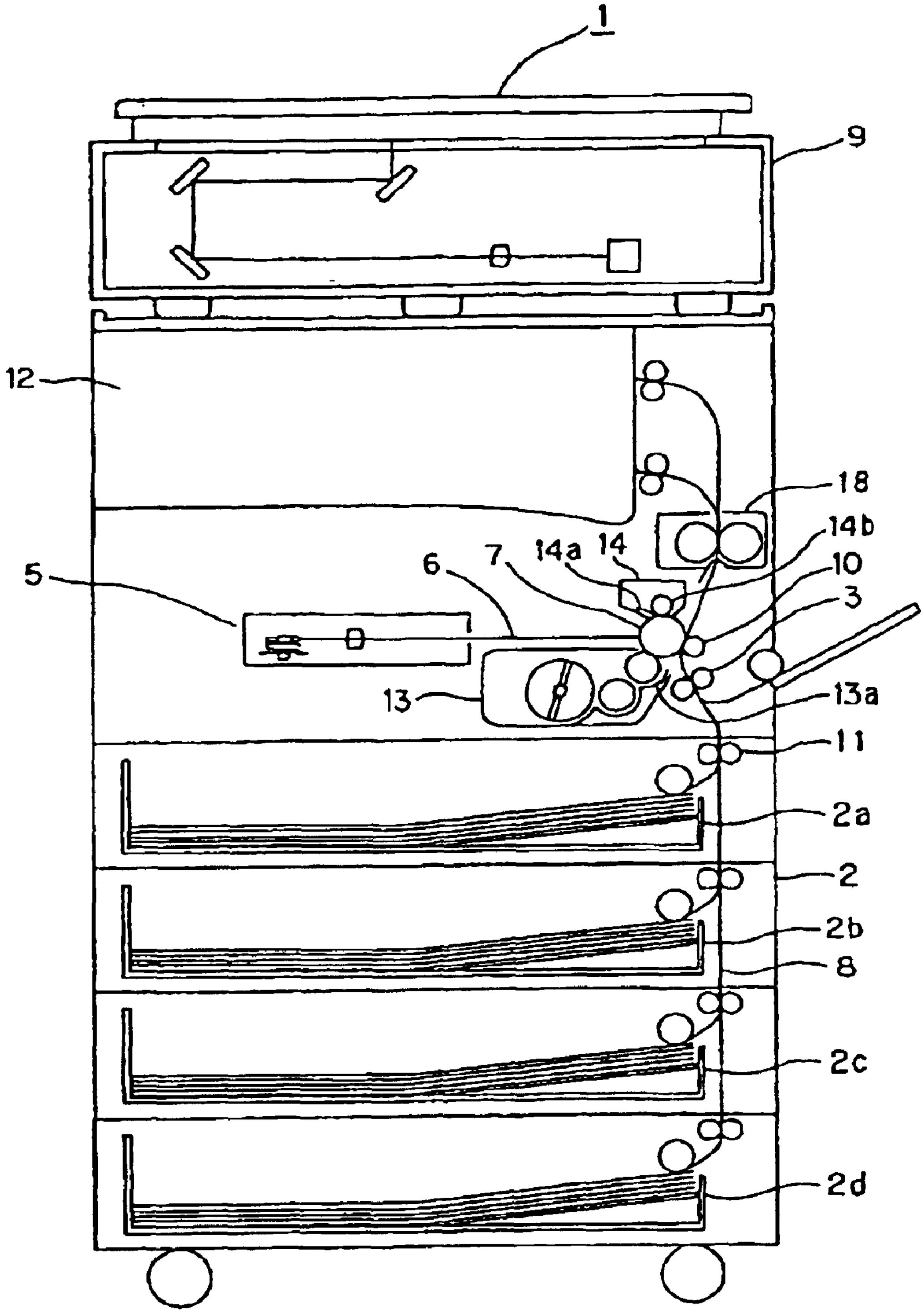
FIG. 1 is a cross sectional view of an image forming apparatus provided with a laser scanner device according to one embodiment of the present invention.

FIG. 1 is a cross sectional view of an image forming apparatus showing one embodiment of the present invention. In this figure, the image forming apparatus, generally designated at reference numeral 1, is provided at its lower portion with a paper feed means 2 including a plurality of paper feed units 2*a*, 2*b*, 2*c*, 2*d*, and at its upper portion with an image reading device 9. Successive sheets of paper sent out one by one from the paper feed units 2*a*, 2*b*, 2*c*, 2*d* of the paper feed means 2 are clampingly conveyed by a plurality of pairs of conveying rollers 11 along a vertical sheet conveying path 8 to arrive at a pair of registration rollers 3.

On the other hand, image information, which has been read in by the image reading device 9, and electronic image information, which has been transmitted through a network or a facsimile line connected to the image forming apparatus 1, are converted from electronic form into optical information. When these pieces of image information are sent to a laser optical(scanner) device 5, which is a means for forming a latent image by irradiating the optical information onto a photosensitive member, an image is formed as a latent image on the photosensitive member in the form of a photosensitive drum 7 by means of a laser beam.

The pair of registration rollers 3 are rotated to convey the sheets of paper by synchronizing the image writing timing at the leading-edge position of each sheet with the laser scanner device 5, so that the toner image on the photosensitive drum 7 is transferred to each sheet of paper by means of a transfer roller 10, and thereafter the sheets are conveyed upwardly to arrive at a fixing unit 18, which is arranged at an upper portion of the apparatus 1. In the fixing unit 18, the unfixed toner is fixed on the sheets of paper under application of pressure and heat, the sheets being then conveyed to a discharged paper stacker 12.

In addition, the toner supplied by a container such as a toner cartridge reaches a developing unit 13, where it further proceeds to a developing sleeve 13*a* while being stirred therein, wherefrom the toner is supplied to the photosensitive drum 7.

On the other hand, an excess portion of the toner, having been transferred to each sheet by the transfer roller 10 and remaining on the photosensitive drum 7, is scraped by a cleaning blade 14*a* attached to a cleaner 14, removed by a conveying screw 14*b*, and stored in a waste toner container (not shown) or the like.

The laser scanner device 5 is disposed substantially horizontally with respect to the photosensitive drum 7, so that the laser beam from the laser scanner device 5 can be horizontally irradiated onto the photosensitive drum 7 as it is, i.e., without being changed in its direction.

Figure 2:
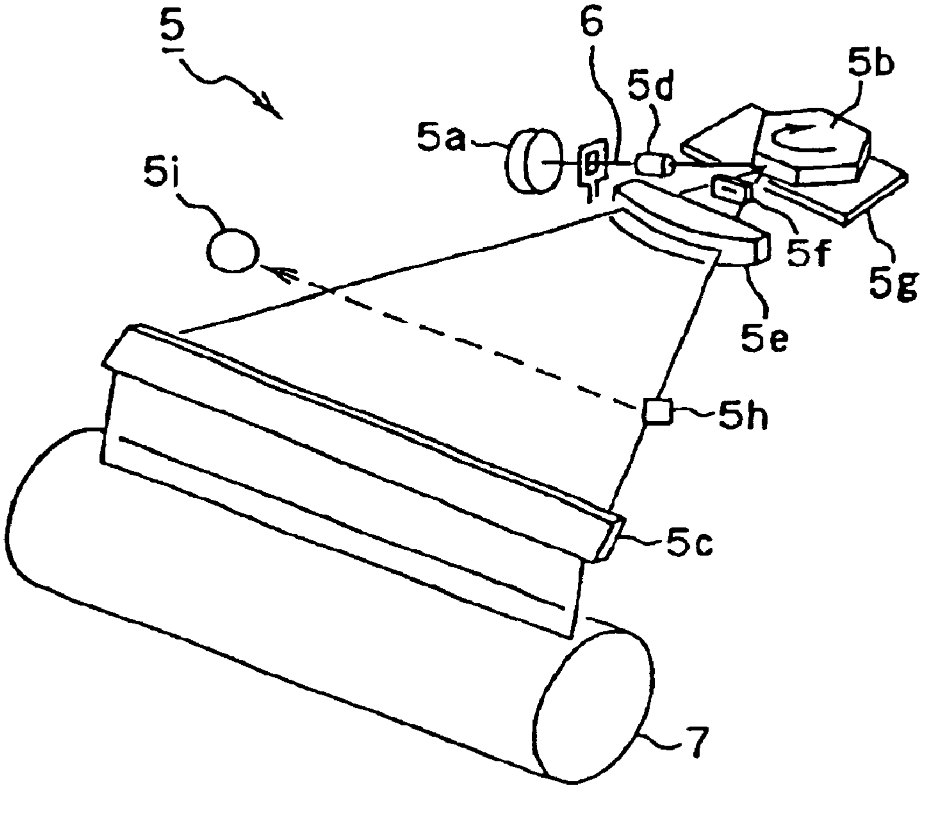
FIG. 2 is a perspective view showing the layout of the laser scanner device according to the embodiment of the present invention.

On the other hand, FIG. 2 is a perspective view showing the arrangement of component parts of a laser optical apparatus. In this figure, the laser scanner device 5 includes a source of light in the form of a laser diode 5*a*. An electronic image signal is sent to a polygon motor 5*g* and a laser substrate through a control part, whereby the polygon motor 5*g* is started to rotate, and when the polygon motor 5*g* reaches a prescribed constant speed, a laser beam 6 is launched from the laser diode 5*a*.

The laser beam 6 passing through a cylindrical lens 5*d* is reflected by a rotating polygon mirror in the form of a polygon mirror 5*b* to further pass through fθ lenses 5*f*, 5*e*, whereafter it is further reflected by a reflection mirror 5*c* with its direction being changed so as to be scanned onto the surface of the photosensitive drum 7 thereby to form a latent image thereon. Here, note that the fθ lenses 5*f*, 5*e* are constructed such that the laser beam reflectively scanned by the polygon mirror 5*b* is caused to focus on the photosensitive drum 7.

Moreover, in order to adjust timing for accurate control of the scanning position, a part of the laser beam from the polygon mirror 5*b* is reflected by a BD mirror 5*h* so that it is received and converted into an electric signal by a BD sensor 5*i*, the electric signal being then sent to a control circuit that controls the polygon motor 5*g* and hence the laser beam.

Figure 3:
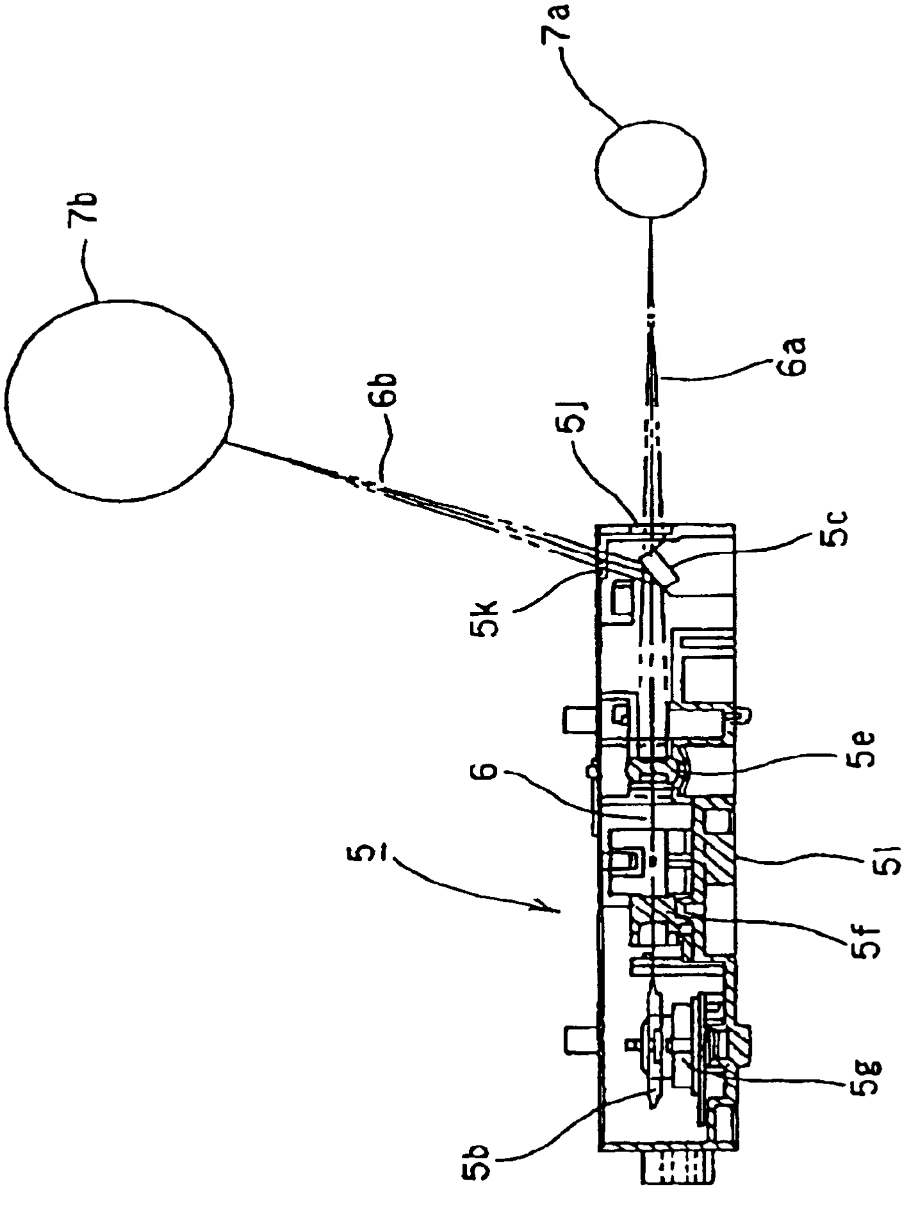
FIG. 3 is a cross sectional view of the laser scanner device according to the embodiment of the present invention.

FIG. 3 is a cross sectional view best showing the configuration of the laser scanner device 5 according to this embodiment of the present invention. In this figure, a scanner casing 51 is beforehand provided with a mounting bearing surface for the reflection mirror 5*c* in order to enable the reflection mirror 5*c* to be installed according to the specification required upon manufacture of the laser scanner device 5. The other component parts designated by the same symbols as those in FIG. 2 are the same ones as in FIG. 2. A laser beam 6 reflected by the polygon mirror 5*b* mounted on a rotating shaft of the polygon motor 5*g* arrives at the mounting bearing surface for the reflection mirror 5*c* through the fθ lenses 5*f*, 5*e*.

In the case of the reflection mirror 5*c* being not installed, the laser beam 6 passes through a dustproof glass 5*j* installed on the scanner casing 51 at a first opening formed therethrough to become a laser beam 6*a*, which is focused on a photosensitive drum 7*a* to form an image thereon.

On the other hand, in the case of the reflection mirror 5*c* being installed, the laser beam 6 is reflected by the reflection mirror 5*c* to pass through a dustproof glass 5*k*, which is installed on the scanner casing 51 at a second opening formed therethrough, to become a laser beam 6*b*, which is then focused on a photosensitive drum 7*b* to form an image thereon.

Thus, in order that two optical paths, one for non-provision of the reflection mirror 5*c*, and the other for provision of the reflection mirror 5*c*, can be formed in accordance with required situations, the scanner casing 51 has the mounting bearing surface for the reflection mirror 5*c*, which is molded from a molding resin for instance. To permit the different laser beam paths to be formed according to the mere presence or absence of the reflection mirror 5*c*, the laser diode 5*a*, the polygon motor 5*g* and the lenses 5*f*, 5*e* are arranged at the upstream side of the reflection mirror 5*c*, so that these components can be used in common regardless of the presence or absence of the reflection mirror 5*c*. On the other hand, at the downstream side of the reflection mirror 5*c*, to ensure the optical paths to the photosensitive drums 7*a*, 7*b*, the first and second openings are formed through the scanner casing 51 at prescribed locations, respectively, so as to permit the laser beam to pass through these openings to the outside of the apparatus.

Here, it is necessary to decide the sizes of these openings such that the laser beam can be passed therethrough to irradiate desired exposure areas required of the photosensitive drums 7*a*, 7*b*, which are members to be irradiated by the laser beam. It is desirable to enlarge the size of the first opening as much as possible while considering the rigidity and the like of the apparatus casing so as to accommodate as many various models as possible, too.

Further, it is also desirable to enlarge the second opening as much as possible while considering the rigidity and the like of the apparatus casing in order that further several kinds of laser beam paths can be formed merely by installing any of reflection mirrors with different reflection angles.

Furthermore, in case where the reflection mirror 5*c* is not provided, the dustproof glass 5*k* installed on the casing 51 at the second opening need not be made of glass. Similarly, in cases where the reflection mirror 5*c* is provided, the dustproof glass 5*j* installed on the casing 51 at the first opening need not be glass, either. In these cases, these dustproof glasses may be replaced with other appropriate closure members or light blocking members such as, for instance, black plastic plates, etc., as long as the openings can only be closed with the closure member, respectively.

Thus, by using component parts for the laser scanner device 5 in common, it becomes possible to readily form several kinds of laser beam paths in accordance with the provision or non-provision of a reflection mirror, by installing, if required, appropriate one of a plurality of reflection mirrors having different reflection angles without changing the basic system or structure of the apparatus.

Figure 4:
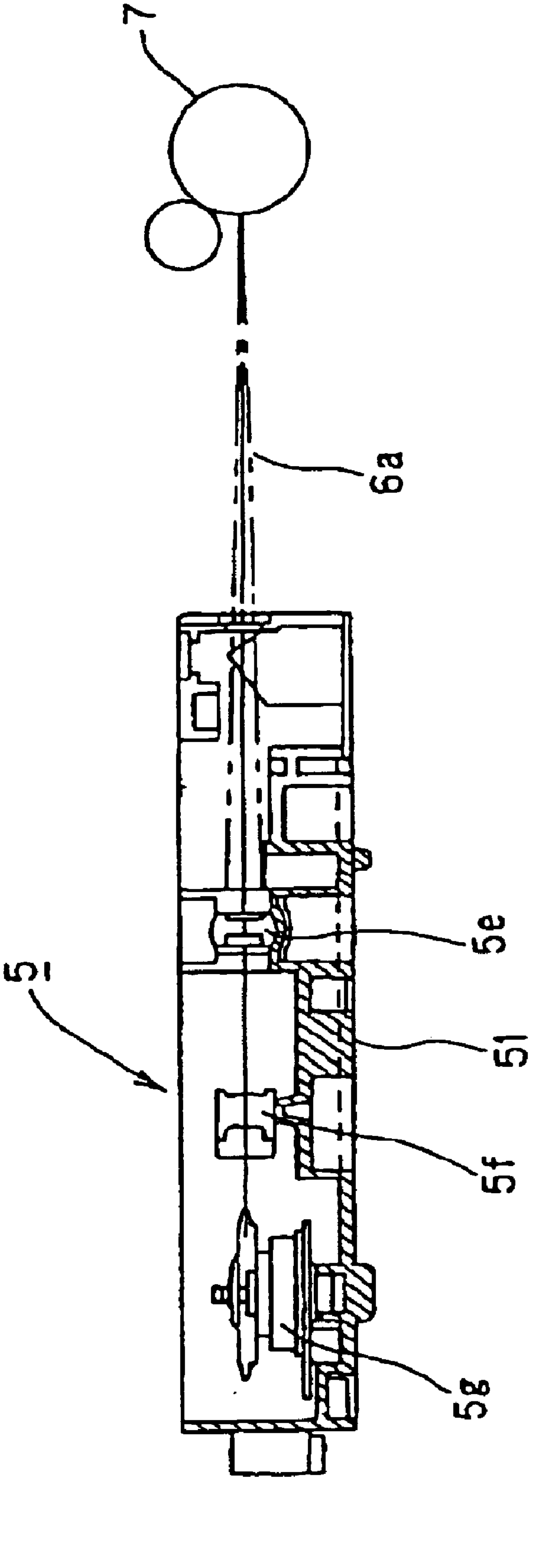
FIG. 4 is a cross sectional view of a laser scanner device unprovided with a reflection mirror according to the embodiment of the present invention.

FIG. 4 shows the laser scanner device 5 when the reflection mirror 5*c* in FIG. 3 is not installed. For instance, application of the present invention to a monochromatic copying machine will result in the image forming apparatus of the configuration as shown in FIG. 1.

Figure 5:
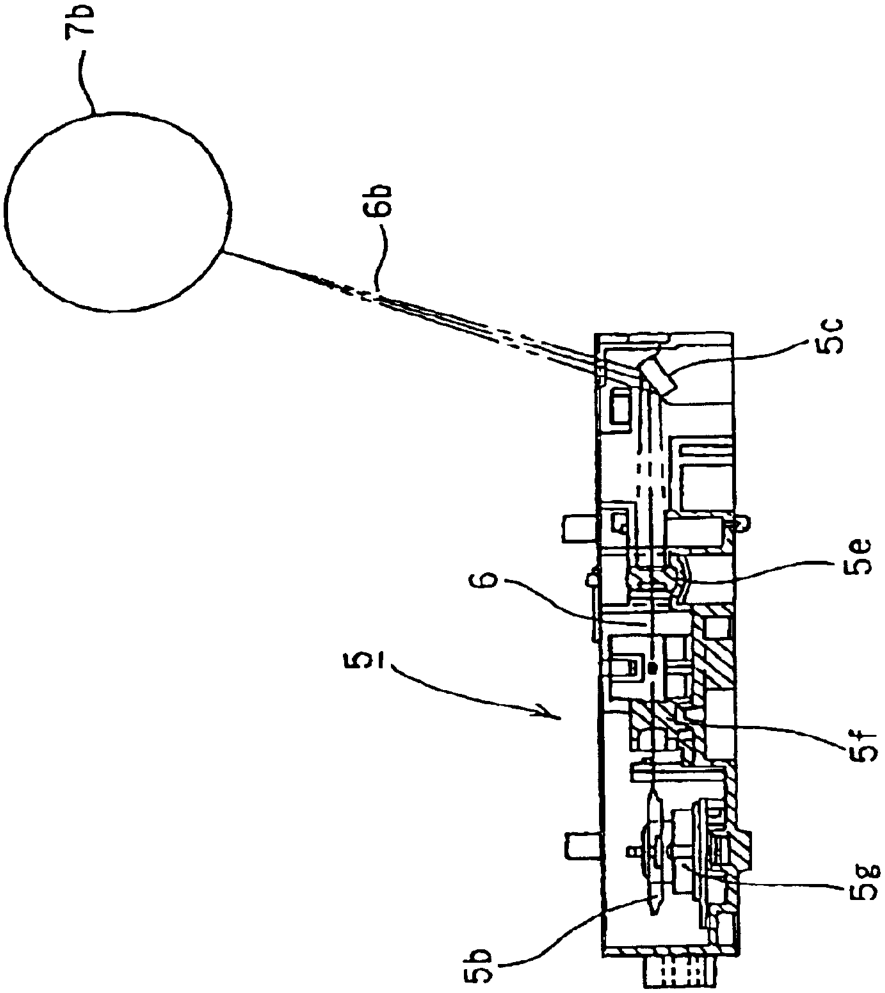
FIG. 5 is a cross sectional view of a laser scanner device provided with a reflection mirror according to the embodiment of the present invention.

On the other hand, FIG. 5 shows the configuration of the laser scanner device 5 when the reflection mirror 5*c* is installed in FIG. 3. In FIG. 5, a laser beam 6, being reflected by the polygon mirror 5*b* mounted on the rotating shaft of the polygon motor 5*g*, passes through the fθ lenses 5*f*, 5*e* and is reflected by the reflection mirror 5*c* to form a laser beam 6*b* which advances to the photosensitive drum 7*b*.

Figure 6:
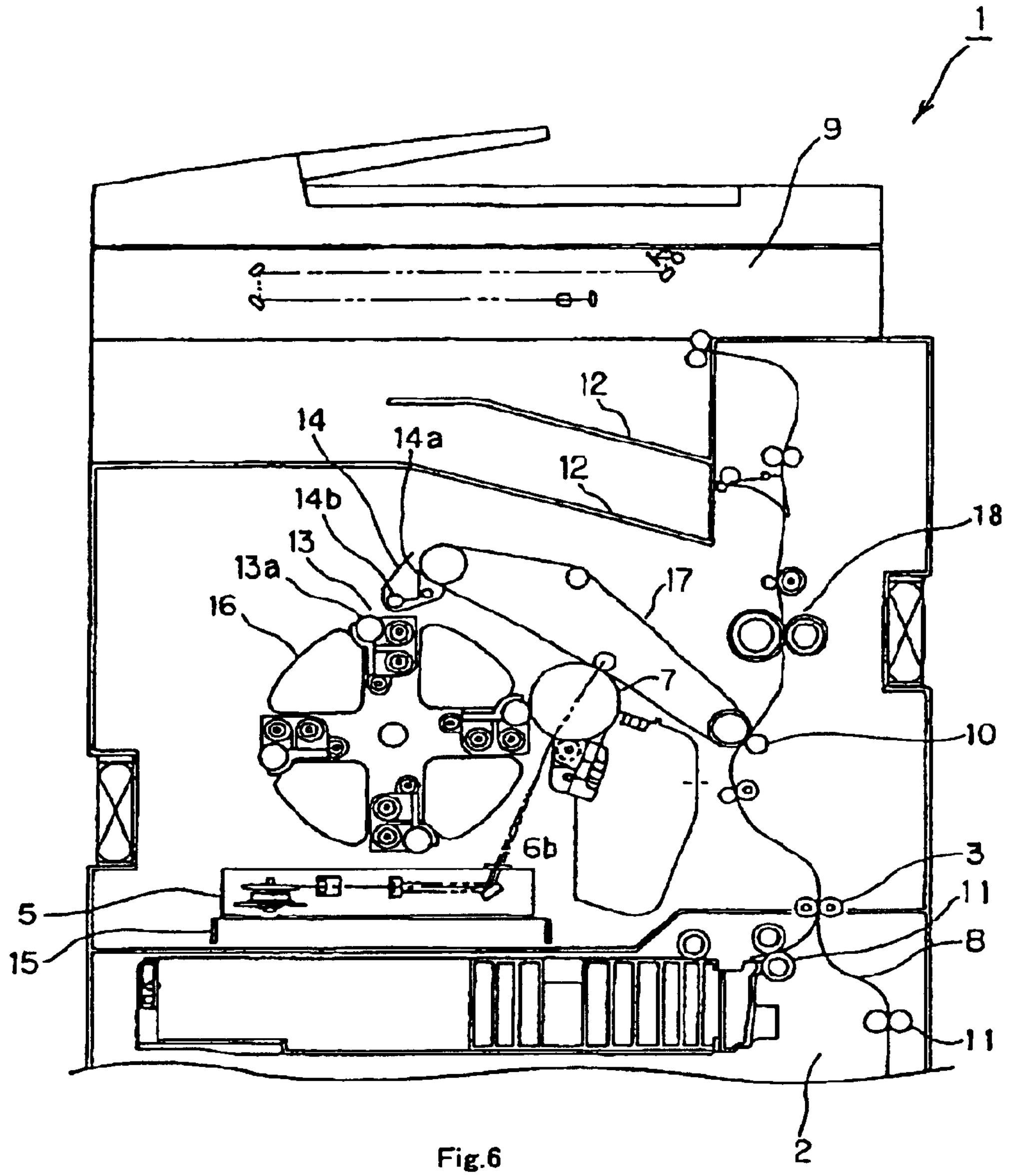
FIG. 6 is a cross sectional view of an image forming apparatus provided with a laser scanner device according to another embodiment of the present invention.

FIG. 6 shows, for instance, a color-image forming apparatus using the laser scanner device 5 of FIG. 5. In FIG. 6, the image forming apparatus 1 is provided at its lower portion with a paper feed means 2, and at its upper portion with an image reading device 9.

Successive sheets of paper sent out one by one from the paper feed means 2 are clampingly conveyed by a plurality of pairs (though only one pair being illustrated) of conveying rollers 11 along a vertical sheet conveying path 8 to arrive at a pair of registration rollers 3.

On the other hand, image information, which has been read in by the image reading device 9, and electronic image information, which has been transmitted through a network or a facsimile line connected to the image forming apparatus 1, are converted from electronic form into optical information. The image information thus converted is sent to the laser scanner device 5, which is a means for forming a latent image by irradiating the optical information onto a photosensitive member, and which is fixedly installed on a holding stay 15. In the laser scanner device 5, an image is formed as a latent image on the photosensitive member in the form of a photosensitive drum 7 by means of a laser beam.

The pair of registration rollers 3 are rotated to convey the sheets of paper by synchronizing the image writing timing at the leading-edge position of each sheet with the laser scanner device 5, so that the toner image on the photosensitive drum 7 is transferred to each sheet of paper by means of a transfer roller 10, and thereafter the sheets are conveyed upwardly to arrive at a fixing unit 18, which is arranged at an upper portion of the apparatus 1. In the fixing unit 18, the unfixed toner is fixed onto the sheets of paper under application of pressure and heat, and the sheets are then conveyed to a discharged paper stacker 12.

In addition, a toner supplied by a container such as one of toner cartridges 16 reaches a corresponding one of developing units 13, where it further proceeds to a corresponding developing sleeve 13*a* while being stirred therein, wherefrom the toner is supplied to the photosensitive drum 7.

The toner image developed by each developing unit 13 is transferred to an image transfer belt (ITB) 17, by which it is then conveyed to the transfer roller 10 of a paper passing and conveying part where the toner image is transferred to the sheets of paper which have been conveyed there from the paper feed means 2.

On the other hand, an excess portion of the toner, having been transferred to each sheet by the transfer roller 10 and remaining on the ITB 17, is scraped by a cleaning blade 14*a* attached to a cleaner 14, removed by a conveying screw 14*b*, and stored in a waste toner container (not shown) or the like.

Since the laser scanner device 5 can be arranged at an arbitrary location with respect to the photosensitive drum 7 at which an image is formed or focused by the reflection mirror 5*c*, it is possible to arrange the laser scanner device 5 in a space below the developing units 13 while enabling the laser beam 6*b* from the laser scanner device 5 to be irradiated onto the photosensitive drum 7.

In addition, in order to permit the fθ lenses 5*f*, 5*e* and the like of FIG. 5 to be used in common with those of FIG. 4, the optical path lengths of laser beams from the point of emission of the laser diode to the photosensitive drum 7 in both of the configurations of FIG. 4 and FIG. 5 are made substantially equal to each other regardless of the presence or absence of the reflection mirror 5*c*.

In the above arrangement, a means for expanding the image information in the main scanning direction by means of the polygon motor 5*g* serves to enable an image to be written into the surface of the photosensitive drum by making the angle of rotation and the pitch of writing irradiation constant by means of the polygon mirror 5*b* and the fθ lenses 5*e*, 5*f*. At this time, in order to decide the image writing position, the position at which a laser beam is emitted by the laser diode is controlled by a laser emission control means by detecting the position and timing of the laser beam by the use of a laser beam detection means in the form of the BD sensor 5*i*.

Here, it is to be noted that the position at which the laser beam is emitted is controlled by deciding a maximum writing width in the main scanning direction through software based on the information on the main scanning and the first writing position obtained beforehand by detecting the position of the laser beam by means of the BD sensor 5*i*.

Moreover, the widths of the lenses and the width of the reflection mirror, which are arranged in the laser beam paths between the laser diode and the reflection mirror mounting bearing surface, are set so as to meet the sizes of several kinds of transfer sheets as well as to accommodate the widest possible sheets.

Further, a means for mounting the laser scanner device 5 is common and unchanged regardless of the presence or absence of the reflection mirror, and hence the holding stay 15 is arranged in consideration of the arrangement of the photosensitive drum 7 employed in the image forming apparatus of FIG. 6 in such a manner that a laser beam from the laser scanner device 5 can be focused on the photosensitive drum 7. Similarly, the holding stay is also arranged in consideration of the arrangement of the photosensitive drum 7 employed in the image forming apparatus of FIG. 1.

In that case, since the area of the second opening is limited by restrictions such as rigidity or the like of the apparatus casing, whether the laser beam reflected by the reflection mirror can be irradiated onto the photosensitive drum depends upon the size of the area of the second opening. Therefore, once the size of the second opening is decided, it should then be grasped beforehand with what angle of a reflection mirror a laser beam reflected therefrom can pass the second opening. In other words, angles at both ends of a maximum allowable angle of the reflection mirror are recognized as a first angle of reflection and a second angle of reflection, respectively. Thereafter, in designing the arrangement of the image forming apparatus, the position of the photosensitive drum is first decided, and an appropriate angle of the reflection mirror is then selectively decided within the range between the first angle of reflection and the second angle of reflection so as to enable the laser beam to be irradiated onto the photosensitive drum while taking account of the position of the holding stay.

Furthermore, by using the laser scanner device according to this embodiment in which the direction of a laser beam to be irradiated on to a photosensitive member can be corrected or adjusted into different directions depending upon the presence or absence and the kind of the reflection mirror, it is possible to commonly use tooling, measuring instruments, etc., for ensuring the accuracy of an image formed. As a result, mass production lines can be smoothly changed for limited production of diversified products, thereby making it possible to improve productivity.

Still further, by applying the above-mentioned laser scanner device to a plurality of image forming apparatuses adopting different optical paths, in recycles such as disassembling and reassembling thereof, a laser scanner device, which has been once used in one image forming apparatus, can be reused in another image forming apparatus of a different construction merely by adding or changing part of the components of the once used laser scanner device. This results in resource savings.

As described in the foregoing, according to the present invention, it is possible to easily form several kinds of laser beam paths by providing or unproviding a reflection mirror or by changing, if provided, the mounting angle of the reflection mirror in accordance with the specification required of a laser scanner device. Accordingly, it is unnecessary to design parts such as laser scanner casings, etc., of a variety of image forming apparatuses in compliance with the specifications thereof, as a consequence of which the man-hours and costs required to individually design such parts and hence apparatuses can be reduced.

In addition, a laser scanner device, which has been once used in one image forming apparatus, can be reused in another image forming apparatus of a different construction merely by adding or removing a reflection mirror to or from the laser scanner device, or by installing a reflection mirror with a different reflection angle on the laser scanner device. This serves to contribute to resource savings as well as improvements in productivity and serviceability.

What is claimed is:

1. A laser optical apparatus for forming an image, comprising:

a laser source for emitting a laser beam;

scanning means for deflecting and scanning the laser beam emitted from said laser source; and an optical casing including a first opening and a second opening, which covers said laser source and said scanning means, wherein said laser optical apparatus is attachable to a first image forming apparatus and a second image forming apparatus, and wherein the first opening is used as an optical path of the laser beam for image exposure in a case where said laser optical apparatus is attached to the first image forming apparatus and the second opening is used as an optical path of the laser beam for image exposure in a case where said laser optical apparatus is attached to the second image forming apparatus.

2. The laser optical apparatus according to claim 1, wherein said first opening serves to permit the laser beam scanned by said scanning means to pass therethrough without changing a direction of the optical path of the laser beam, and said second opening serves to permit the laser beam scanned by said scanning means and reflected by a mirror to pass therethrough.

3. The laser optical apparatus according to claim 2, wherein said optical casing includes a mirror mounting portion for mounting said mirror which serves to reflect the laser beam toward said second opening.

4. The laser optical apparatus according to claim 3, wherein said mirror mounting portion serves to mount said mirror thereon in such a manner that said mirror has a variable reflection angle with respect to the laser beam.

5. The laser optical apparatus according to claim 1, wherein one of said first and second openings formed for permitting the laser beam to pass therethrough is closed with a light transmission member, and the other opening is closed with a light blocking member.

6. An optical casing covering image exposure means for irradiating a laser beam for image exposure, comprising:

a first opening through which the laser beam is irradiated from inside of said optical casing;

a second opening through which the laser beam is irradiated from inside of said optical casing, wherein said optical casing is attachable to a first image forming apparatus and a second image forming apparatus, and wherein said first opening is used as an optical path of the laser beam for image exposure in a case where said optical casing is attached to the first image forming apparatus and said second opening is used as an optical path of the laser beam for image exposure in a case where said optical casing is attached to the second image forming apparatus.

7. The optical casing according to claim 6, said optical casing is integrally movable together with a laser source for emitting the laser beam and a scanning means for deflecting and scanning the laser beam emitted from the laser source.

8. The optical casing according to claim 6, wherein one of said first and second openings formed for permitting the laser beam to pass therethrough is closed with a transmission member, and the other opening is closed with a blocking member.

9. A laser optical unit for forming an image, comprising:

a laser source for emitting a laser beam;

scanning means for deflecting and scanning the laser beam emitted from said laser source;

an optical casing having a first opening and a second opening, which covers said laser source and said scanning means, wherein said laser optical unit is attachable to a first image forming apparatus and a second image forming apparatus, and wherein the first opening is used as an optical path of the laser beam for image exposure in a case where said laser optical unit is attached to the first image forming apparatus and said second opening is used as an optical path of the laser beam for image exposure in a case where the laser optical unit is attached to the second image forming apparatus.

* * * * *

UNITED STATES PATENT AND TRADEMARK OFFICE

CERTIFICATE OF CORRECTION

PATENT NO. : 6,965,104 B2
DATED : November 15, 2005
INVENTOR(S) : Yoshimasu Yamaguchi It is certified that error appears in the above-identified patent and that said Letters Patent is hereby corrected as shown below:

Column 1,
Line 21, "fo" should read -- of --.

Column 2,
Line 24, "fo" should read -- of --.

Column 3,
Lines 10, 16, 19, 22, 25 and 40, "cross sectional" should read -- cross-sectional --.

Column 4,
Line 50, "cross sectional" should read -- cross-sectional --.

Column 9,
Line 11, "claim 6," should read -- claim 6, wherein --.

Signed and Sealed this

Ninth Day of May, 2006

JON W. DUDAS
*Director of the United States Patent and Trademark Office*